Sept. 6, 1960 S. M. SCHREINER 2,951,989

DETECTOR CIRCUIT

Filed July 5, 1957 2 Sheets-Sheet 1

Inventor
STANLEY M. SCHREINER
By Alfred C. Hill
Agent

DETECTOR CIRCUIT

Filed July 5, 1957 2 Sheets-Sheet 2

Inventor
STANLEY M. SCHREINER
By Alfred C. Hill
Agent 2,951,989

DETECTOR CIRCUIT

Stanley M. Schreiner, Nutley, N.J., assignor to International Telephone and Telegraph Corporation, Nutley, N.J., a corporation of Maryland Filed July 5, 1957, Ser. No. 670,201

6 Claims. (Cl. 328—119)

This invention relates to detector circuits and more particularly to a circuit for detecting a signal having a plurality of regularly spaced pulses, such as is utilized as a synchronizing signal in certain multiplex communication systems.

Pulse-type multiplex communication systems wherein the intelligence of a channel is carried by varying a characteristic of the pulse, such as amplitude, width or time position, or wherein the intelligence of a channel is carried by a coded sequence of pulses have a synchronizing signal to assure synchronization between transmitter and receiver. The synchronizing signal may have any desired distinguishing characteristic which distinguishes it from the channel or modulated signals. The distinguishing characteristic may be pulse width, pulse amplitude or a plurality of regularly spaced pulses of substantially constant amplitude and width. The latter type synchronizing signal has found great acceptance in multichannel communication systems, particularly of the pulse time modulation type. When the number of channels are relatively small, say in the order of 24 or less, a double pulse synchronizing signal functions nicely to provide the desired synchronization and is relatively easy to detect. However, with the advent of new multichannel systems which enable at least the doubling of the number of channels in substantially the same allocated bandwidth, synchronizing error resulted due to detection of adjacent channel pulses which are deviated by their respective modulating signals to a position where the time spacing was identical to the spacing of the double pulse synchronizing signal. To eliminate the synchronizing error in the increased channel systems, a synchronizing signal having three regularly spaced pulses has been resorted to.

The use of the triple pulse synchronizing signal necessitated the development of a detector for this signal which would produce a timing pulse coincident with the last pulse of the synchronizing signal as in the double pulse arrangement. Two arrangements have been previously suggested. The first arrangement employs two double pulse synchronizing signal detectors connected in tandem. This arrangement has the disadvantage of requiring two stages of detection. The second arrangement employs one tube with two properly dimensioned delay lines in the anode circuit of the tube. In the detection operation, this arrangement ideally gives relative pulse heights of 1, 1½, 2, 1, ½. This arrangement has two disadvantages. First, it is more difficult to distinguish between the wanted pulse, the timing signal, and the unwanted pulse when the percentage difference between the pulse amplitudes is small. Second, because of the rise time limitations of practical delay lines, the actual percentage difference between the amplitudes of the various pulses is smaller than the theoretical value. In addition, this arrangement, while economical of tubes, requires two expensive delay lines.

Therefore, an object of this invention is to provide a detector circuit for detecting a signal having three regularly spaced pulses which is relatively simple and economical.

In the discussion of the prior art, only double and triple pulse synchronizing signals have been mentioned since they are the ones at present being employed. However, the detector circuit of this invention may be readily adapted to produce a timing signal from a synchronizing signal having any given number of regularly spaced pulses.

Therefore, another object of this invention is to provide a simple and relatively economical detector circuit for detecting a signal having any given number of regularly spaced pulses to produce a timing signal time coincident with the last pulse of the signal for purposes of synchronization.

Economically, it would be impossible to replace all the old systems employing double pulse synchronizing signals with the new systems employing triple pulse synchronizing signals. Therefore, it would be an advantage if the synchronizing signal detector circuit was compatible with the existing system. That is, the detector circuit should be able to detect double pulse as well as triple pulse synchronizing signals with a minimum of manipulation and adjustment. The previous triple pulse detectors are not readily convertible to detect double pulse synchronizing signals.

Therefore, a further object of this invention is to provide a simple and relatively economical compatible detector circuit which may readily be converted from a triple pulse to a double pulse signal detector.

A feature of this invention is the provision of a detector to detect a signal having a plurality of regularly spaced pulses comprising a delay line having a time delay equal to an integral multiple of the time spacing between the pulses of said signal, means to terminate the delay line in an open circuit or the delay line characteristic impedance depending upon the number of pulses in said signal, means coupling said signal to the other end of said delay line, a coincidence device, means coupling the pulses at said one end of said delay line to said coincidence device. The coincidence device operates to pass at least one pulse wherein this one pulse is coincident in time with the last pulse of said signal. At the output of the coincidence device is a means to pass only said one pulse and block other pulses passing through the coincidence device.

Another feature of this invention is the provision of a threshold device to pass from the output of the coincidence device only that pulse which is coincident in time with the last pulse of the signal.

Still another feature of this invention is the provision of an open-circuited termination for the delay line when an odd number of pulses are contained in the regularly spaced pulse signal.

A further feature of this invention is the provision of a termination of the delay line in its characteristic impedance when an even number of pulses are contained in the regularly spaced pulse signal.

The above-mentioned and other objects and features of this invention will become more apparent by reference to the following description taken in conjunction with the accompanying drawings, in which.

Figure 1:
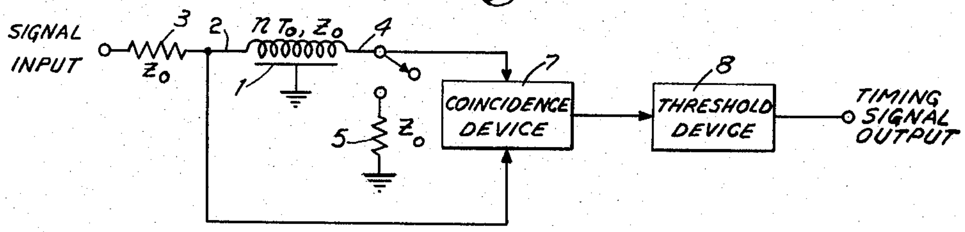
Fig. 1 is a schematic diagram, partially in block form, of a detection circuit in accordance with the principles of this invention.

Referring to Fig. 1, the detector circuit of this invention is illustrated as including a delay line 1 having a time delay equal to an integral multiple of the time spacing between the regularly spaced pulses coupled to the sending end 2 of delay line 1 by a matched source impedance represented schematically by resistor 3. The receiving end 4 of delay line 1 is terminated in either an open circuit or a resistor 5 equal to the characteristic impedance of delay line 1 by means of switch 6. The resulting pulses at receiving end 4 and sending end 2 are coupled to a coincidence device 7 wherein at least one pulse coincident in time with the last pulse of the input signal is passed. The output of device 7 is coupled to threshold device 8 to assure that only that pulse coincident with the last pulse of the input signal is present for the desired timing signal.

The operation of the circuit of Fig. 1 will be discussed hereinbelow with particular reference to a triple pulse synchronizing signal and a double pulse synchronizing signal. It is to be understood, however, that the application of the detector circuit is not limited thereto. By proper selection of the time delay of delay line 1 and the termination thereof, it is possible to detect and produce a timing signal coincident with the last pulse of the input signal for an input signal having any number of regularly spaced pulses. The resulting detection circuits are not always compatible as is the circuit employed for triple and double pulse synchronizing signals since the time delay of the delay line may have to be changed to accommodate signals having pulses more than three. However, it has been found that the delay line termination to detect a signal having an odd number of regularly spaced pulses is an open circuit and the delay line terminator, to detect a signal having an even number of regularly spaced pulses is the characteristic impedance of the delay line. For instance, to detect a signal having five pulses, the termination is an open circuit and the delay line has a time delay of two times the spacing between adjacent pulses of the input signal and to detect a signal having four pulses, the termination is the characteristic impedance of the delay line and the delay line has a time delay of three times the spacing between adjacent pulses of the inpnt signal.

Figure 2:
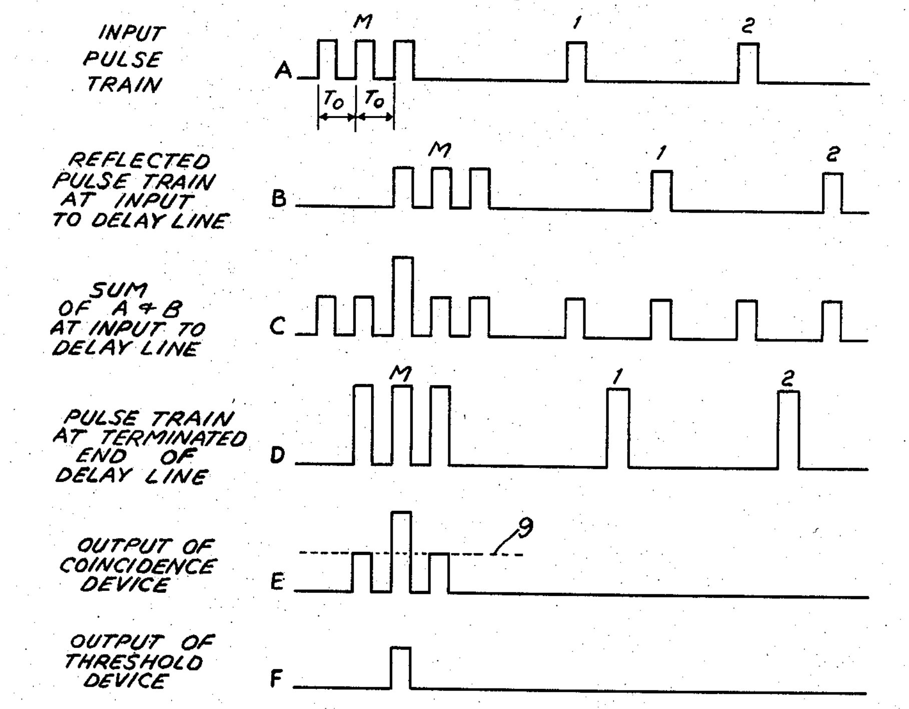
Fig. 2 is a set of curves useful in understanding the operation of the circuit of Fig. 1 when utilized to detect a triple pulse synchronizing signal.
Figure 3:
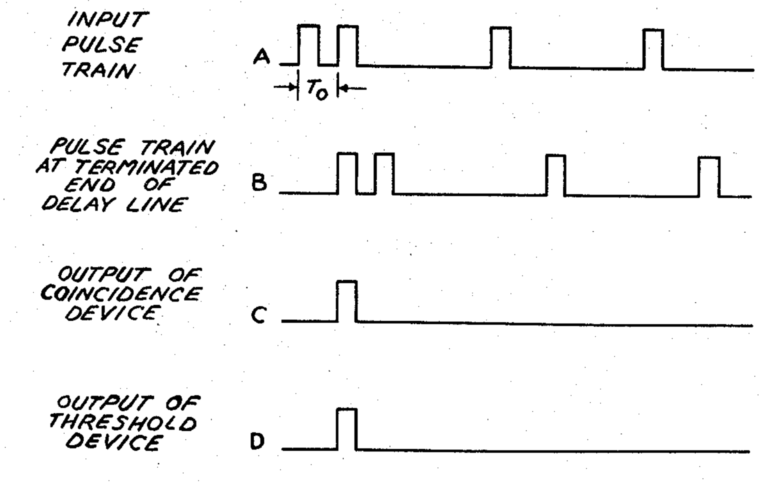
Fig. 3 is a set of curves useful in understanding the operation of the circuit of Fig. 1 when utilized to detect a double pulse synchronizing signal.

Referring to Figs. 1 and 2, the operation of the detector circuit for detecting a triple pulse synchronizing signal is as follows. Delay line 1 has a time delay equal to $T_0$, the spacing between the regularly spaced pulses of the signal illustrated in curve A, Fig. 2. The signal of curve A, Fig. 2, is coupled to sending end 2 for travel down delay line 1 to the receiving end 4 which is terminated in an open circuit. The open circuit produces a reflection of the incident wave back to sending end 2 with the same polarity as the incident wave and which will be delayed by $2T_0$ when it arrives at sending end 2. This is illustrated in curve B, Fig. 2. The resulting wave at sending end 2 is the sum of the input signal, curve A, Fig. 2, and the reflected wave, curve B, Fig. 2, as shown in curve C, Fig. 2. The signal at the receiving end 4 which is open-circuited will be twice the amplitude of the signal at the sending end 2 due to the addition of the incident wave and the reflected wave at receiving end 4. This double amplitude pulse wave will be delayed by an amount $T_0$ as is illustrated in curve D, Fig. 2. The resultant signal at sending end 2, curve C, Fig. 2, and the resultant signal at receiving end 4, curve D, Fig. 3, are combined in coincidence device 7 resulting in a signal output therefrom as shown in curve E, Fig. 2. Three pulses are presented at the output of device 7 of relative amplitude 1, 2, 1 and with one of the pulses of the three, the central one, being coincident with the last pulse of the input signal and having an amplitude twice that of the other two pulses passed by device 7. It is relatively easy to separate the desired double amplitude pulse where threshold device 8 is adjusted to have a threshold level equal to a value represented by line 9 in curve E, Fig. 2. The output of device 8 is then as shown at curve B, Fig. 2, and would be utilized as the timing signal to bring about synchronization of the transmitter and receiver.

The detection of a double pulse synchronizing signal is accomplished in a similar manner and with a delay line having a time delay also equal to $T_0$ by moving switch 6 to place resistor 5 across receiving end 4 thereby terminating delay line 1 in its characteristic impedance. The signal of curve A, Fig. 3, is applied to sending end 2 of delay line 1 for transmission down delay line 1 to receiving end 4. Since receiving end 4 is terminated in the delay line characteristic impedance, there is no reflection and the wave curve A, Fig. 3, merely experiences a delay $T_0$ as illustrated in curve D, Fig. 3. The wave at sending end 2, curve A, Fig. 3, and the wave at receiving end 4, curve B, Fig. 3, are coupled to the coincidence device 7 wherein a single pulse is produced at the output thereof coincident with the last pulse of the input signal, such as is illustrated in curve C, Fig. 3. The threshold device 8 has its threshold level connected to some predetermined reference potential, such as ground, to pass the pulse of curve C, Fig. 3, with little or no change therein to its output as depicted in curve D, Fig. 3.

Figure 4:
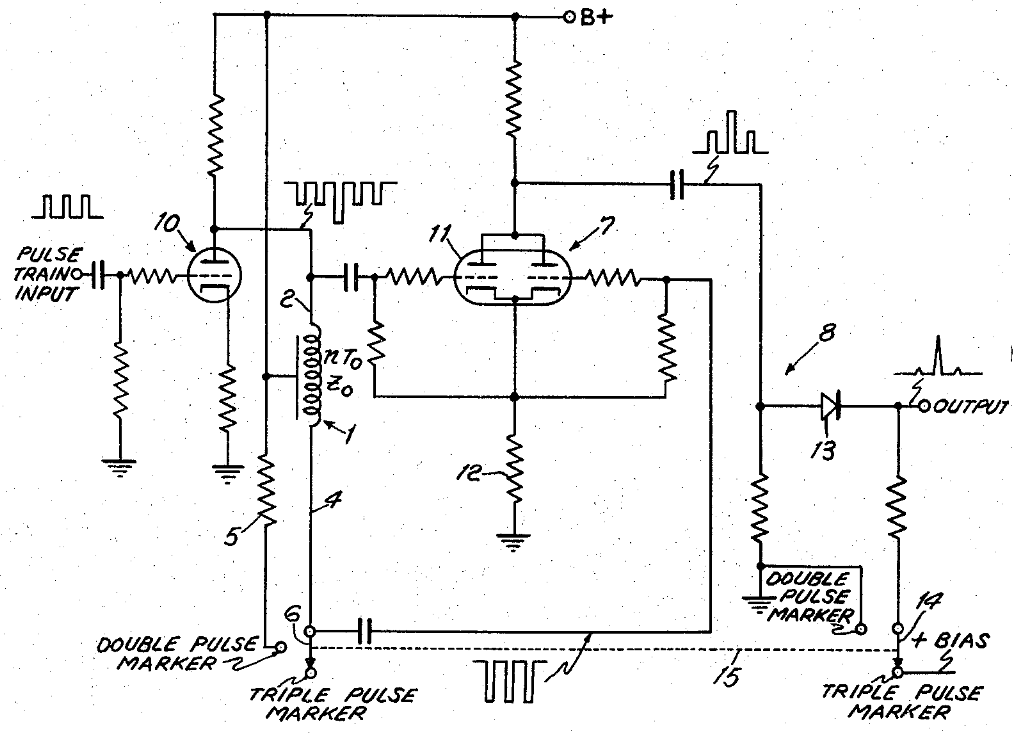
Fig. 4 is a schematic diagram of one form the circuit of Fig. 1 may take.

Fig. 4 illustrates a schematic of a successful reduction to practice utilizing the principles set forth hereinabove with respect to Figs. 1, 2, and 3. Components in Fig. 4 are given the same reference characters as the corresponding components of Fig. 1. Triode amplifier 10 is employed as the matched source impedance and is used to drive delay line 1. Receiving end 4 is illustrated as having a switch 6 in association therewith to selectively terminate delay line 1 as discussed above for utilization in a compatible system for detecting double and triple pulse synchronizing signals. A dual triode 11 with a common cathode resistor 12 and balanced grid leak and input circuits are employed as coincidence device 7. The threshold device 8 is illustrated as being a diode 13 having an adjustable bias supplied thereto. When detecting a triple pulse synchronizing signal, switch 14 is coupled to a positive bias to give a positive threshold level, and when detecting a positive signal, switch 14 connects the anode of diode 13 to ground. For convenience, switches 6 and 14 may be ganged together as represented by mechanical connection 15.

While I have described above the principles of my invention in connection with specific apparatus, it is to be clearly understood that this description is made only by way of example and not as a limitation to the scope of my invention as set forth in the objects thereof and in the accompanying claims.

I claim:

1. A detector to detect a signal having a plurality of regularly spaced pulses comprising a delay line having a time delay equal to an integral multiple of the time spacing between the pulses of said signal, means to selectively terminate one end of said delay line in an open circuit for an odd number of pulses in said signal and in the characteristic impedance of said delay line for an even number of pulses in said signal, means coupling said signal to the other end of said delay line, a coincidence device, means coupling the pulses at said one end of said delay line to said coincidence device, means coupling the pulses at said other end of said delay line to said coincidence device, said coincidence device being responsive to the pulses at said one end of said delay line and the pulses at said other end of said delay line to pass at least one pulse, said one pulse being coincident in time with the last pulse of said signal, and means coupled to the output of said coincidence device to pass only said one pulse.

2. A detector to detect a signal having a plurality of regularly spaced pulses comprising a delay line having a time delay equal to an integral multiple of the time spacing between the pulses of said signal, means to selectively terminate one end of said delay line in an open circuit for an odd number of pulses in said signal and in the characteristic impedance of said delay line for an even number of pulses in said signal, means coupling said signal to the other end of said delay line, a coincidence circuit, means coupling the pulses at said one end of said delay line to said coincidence device, means coupling the pulses at said other end of said delay line to said coincidence device, said coincidence device being responsive to the pulses at said one end of said delay line and the pulses at said other end of said delay line to pass at least one pulse, said one pulse being coincident in time with the last pulse of said signal, and threshold means coupled to the output of said coincidence device to pass only said one pulse.

3. A detector to detect a signal having an odd-numbered plurality of regularly spaced pulses comprising a delay line having a time delay equal to an integral multiple of the time spacing between the pulses of said signal, means coupling said signal to one end of said delay line, means terminating the other end of said delay line in a reflecting termination to reflect the signal to said one end of said delay line for time coincidence between the last pulse of said signal and the first pulse of said reflected signal and to double the amplitude of the signals at said oher end of said delay line, a coincidence device, means coupling said double amplitude pulses to said coincidence device, means coupling the sum of said signal and said reflected signal to said coincidence device, said coincidence device being responsive to said double amplitude pulses and the sum of said signal and said reflected signal to pass a plurality of output pulses, one of said output pulses being coincident in time with the last pulse of said signal and having an amplitude at least twice that of the other of said output pulses, and means coupled to the output of said coincidence device to pass only said one of said output pulses.

4. A detector to detect a signal having an odd-numbered plurality of regularly spaced pulses comprising a delay line having a time delay equal to an integral multiple of the time spacing between the pulses of said signal, means coupling said signal to one end of said delay line, means terminating the other end of said delay line in a reflecting termination to reflect the signal to said one end of said delay line for time coincidence between the last pulse of said signal and the first pulse of said reflected signal and to double the amplitude of the signals at said other end of said delay line, a coincidence device, means coupling said double amplitude pulses to said coincidence device, means coupling the sum of said signal and said reflected signal to said coincidence device, said coincidence device being responsive to said double amplitude pulses and the sum of said signal and said reflected signal to pass a plurality of output pulses, one of said output pulses being coincident in time with the last pulse of said signal and having an amplitude at least twice that of the other of said output pulse, and threshold means coupled to the output of said coincidence device to pass only said one of said output pulses.

5. A detector to detect a signal having either two or three regularly spaced pulses comprising a delay line having a time delay equal to the time spacing between the pulses of said signal, means to selectively terminate one end of said delay line in an open circuit for an input signal having three regularly spaced pulses and in the characteristic impedance of said delay line for an input signal having two regularly spaced pulses, means coupling the input signals to the other end of said delay line, a coincidence device, means coupling the pulses at said one end of said delay line to said coincidence device, means coupling the pulses at said other end of said delay line to said coincidence device, said coincidence device being responsive to the pulses at said one end of said delay line and the pulses at said other end of said delay line to pass at least one pulse, said one pulse being coincident in time with the last pulse of said input signal, and means coupled to the output of said coincidence device to pass only said one pulse.

6. A detector to detect a signal having either two or three regularly spaced pulses comprising a delay line having a time delay equal to the time spacing between the pulses of said signal, means to selectively terminate one end of said delay line in an open circuit for an input signal having three regularly spaced pulses and in the characteristic impedance of said delay line for an input signal having two regularly spaced pulses, means coupling the input signals to the other end of said delay line, a coincidence device, means coupling the pulses at said one end of said delay line to said coincidence device, means coupling the pulses at said other end of said delay line to said coincidence device, said coincidence device being responsive to the pulses at said one end of said delay line and the pulses at said other end of said delay line to pass three pulses when said input signal includes three pulses with the central pulse thereof being coincident in time with the last pulse of said input signal and having an amplitude twice the amplitude of the other two pulses and said coincidence device being responsive to the pulses at said one end of said delay line and the pulses at said other end of said delay line to pass one pulse coincident with the last pulse of said input signal when said input signal includes two pulses, a ground potential, a positive bias equal to half the amplitude of said central pulse, a threshold device, and a selective means coupling said positive bias to said threshold device to pass that portion of said central pulse above said bias when said input signal includes three pulses and coupling said ground potential to said threshold device to pass said pulse when said input signal includes two pulses.

References Cited in the file of this patent

UNITED STATES PATENTS

| | | |
|---|---|---|
| 2,211,942 | White | Aug. 20, 1940 |
| 2,227,052 | White | Dec. 31, 1940 |
| 2,522,706 | Toro | Sept. 19, 1950 |
| 2,710,351 | Lebacqz | June 7, 1955 |
| 2,795,775 | Faymoreau et al. | June 11, 1957 |